COMMUNICATIONS CONTROL SYSTEM

Filed May 16, 1963 3 Sheets-Sheet 1

INVENTORS
RALPH A. GREGORY
NORMAN S. STOCKDALE
BY Alan E. J. Branigan
AGENT

Feb. 13, 1968 R. A. GREGORY ET AL 3,369,109

COMMUNICATIONS CONTROL SYSTEM

Filed May 16, 1963 3 Sheets-Sheet 2

United States Patent Office 3,369,109 Patented Feb. 13, 1968

3,369,109
COMMUNICATIONS CONTROL SYSTEM
Ralph A. Gregory, Endwell, N.Y., and Norman S. Stockdale, Rochester, Minn., assignors to International Business Machines Corporation, New York, N.Y., a corporation of New York
Filed May 16, 1963, Ser. No. 280,824
3 Claims. (Cl. 235—61.11)

ABSTRACT OF THE DISCLOSURE

A control record having prerecorded thereon groups of sensible code indicia. Also present are character designating positions, one for each group of sensible indicia. Sensing means generate electrical signals from the sensible indicia and further means select for transmission, and transmit, only those signals derived from sensible code groups whose corresponding character designating position is made sensible.

This invention relates to communications control system and more particularly to a record controlled system for remotely controlling the operations of data processing devices.

One type of control record commonly used in data processing machines is a mark-sense record card wherein marks comprised of a conducting material are placed at selected points on the card. Each mark represents a particular digit corresponding to the position on the card where the mark is placed. The card is interpreted by electrically sensing the marks, in a manner whereby electrical pulses derived from the marks have a card-related digit significance. That is, a particular series of pulses has meaning only insofar as the pulses can be identified with a particular group of marks on a card. The major advantage of a mark-sense type of record is that it is readily adapted for use "in the field" where punching or other elaborate recording mechanisms are not available.

The advent of a new generation of data processing equipment has made it desirable to transmit data from the control records to a more centrally located processing station. A major problem has been encountered, however, in that, without elaborate equipment to synchronize a remotely located processor with the mechanism for sensing the control records, the digit significance of the electrical pulses derived from the control records is lost during an attempted transmission. This has been solved by translating card related electrical pulses into an independent coded form of the corresponding digit, serializing the coded form, and transmitting the resultant serial form to the processing station.

Another solution to this problem has been provided by using a control record the data on which is coded as it is placed on the record. An example of this is a control record wherein each character that is placed thereon is divided into a plurality of zones. The zones are selectively made magnetic or not, depending upon the particular character, in accordance with a predetermined code. The result is a visible impression of a character on the card and at the same time the recording of an invisible magnetic impression of that character in a code. As the control record is read by a magnetic sensing mechanism the output of the sensing device is a series of groups of code pulses representing the data on the control record. These groups of code pulses may then be transmitted and subsequently utilized by a receiving processor without the necessity of a separate coding operation.

The above described coded-recording process cannot be applied to control records that are desired to be marked "in the field." Field marked control records must still be sensed, the data translated into coded form and serialized before transmission. Here, the problem of not being able to conveniently transmit the data recorded on field marked records still exists. An example of the problem might be seen in a multi-state utility company that employs meter readers at branch offices to read the meters of residential consumers. If the employee records readings on a mark-sense record the data thereon must be sensed, coded, and serialized before it can be transmitted from the branch office to a receiver at a central processing location. On the other hand if it is desired to use coded-recording apparatus, the employee's readings must be transcribed into the coded recording form which, of course, defeats the purpose of the mark-sense record.

It is accordingly a primary object of this invention to provide a control record that is capable of being marked "in the field" and is adapted to have information thereon transmitted directly to a distant processing station without the previous requirement that the information be passed through separate coding apparatus before it is transmitted.

Present types of mark-sense records are not conveniently adapted to record both alphabetic and numeric characters. This is so because the space requirements of all 26 standard alphabetic characters and ten numeric digits are prohibitive for a normal mark-sense record.

It is therefore a further object of this invention to provide an alphanumeric control record, which, while fulfilling the above object, provides in addition thereto a convenient form of aliphanumeric control.

According to the invention, a control record for controlling a data processing machine has prerecorded thereon sensible groups of code indicia. Characters are also prerecorded at character designating positions on the control record but they are not sensible. Each character designating position, and therefore each prerecorded character, is spatially related to a corresponding group of the sensible code indicia. The control record is adapted so that a sensible mark or other sensible indicium may be placed at the location of a selected prerecorded character. Without a mark in a character designating position, no electrical signals derived from the related group of code indicia will be transmitted. A mark, however, acts as a control designation and is operative to select the corresponding group of code indicia for subsequent transmission. In other words, a group of code indicia is only transmitted when it is designated by a sensible mark at the corresponding character designating position.

It is a further object of the invention to provide an apparatus for sensing control records of the kinds described above, and transmitting signals representing the data recorded thereon to a receiving station, without the intervention of a separate coding apparatus.

According to the invention, the system which is used to transmit data from the records described above is so controlled that only the designated group of code indicia are transmitted.

An advantage of this invention lies in the fact that even though the control record of the invention allows field marking without requiring separate pretransmission coding, standard sensing and transmission components may be utilized in combination with the control record to form a system capable of effecting transmission of the desired data form.

The foregoing and other objects, features and advantages of the invention will be apparent from the following more particular description of preferred embodiments of the invention as illustrated in the accompanying drawings.

Figure 1:
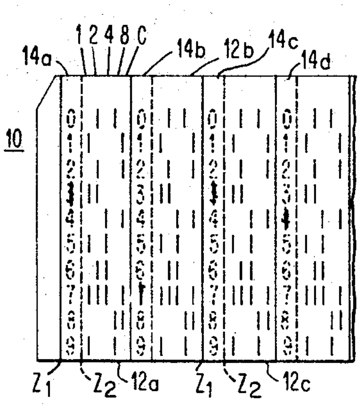
FIG. 1 is a fragmentary plan view of an embodiment of a control record of the numeric type, in accordance with the invention.

One embodiment of the invention will now be briefly described. In FIG. 1 a control record 10 has located thereon a plurality of fields 12 which have groups of sensible code indicia recorded thereon. Associated with each field 12 is a corresponding field 14. The fields 14 have non-sensible digits 0–9 visibly recorded thereon, a different one of the digits being associated with each of the groups of code indicia in the corresponding fields 12.

Each group of code indicia is comprised of a bit pattern having five possible bit positions. The particular code for the bit patterns illustrated in the drawings is generally referred to as binary-coded-decimal with an even-parity check bit. That is: Each of the first four bits is assigned a weighted value of one, two, four or eight respectively; the total of the weighted values indicating the corresponding decimal value. Check bits are inserted as required to insure the presence of an even number of bits for each decimal digit. It is to be understood, however, that the particular bit pattern corresponding to a particular code is of no consequence to the invention so long as the code, however arbitrary, is predetermined.

Preceding each of the zones 14 is a sensible zone line $Z_1$. Separating the 12 and 14 zones are non-sensible zone lines $Z_2$.

Each non-sensible character, in zone 14, for example, locates a character designating position. That is because a sensible mark placed on a non-sensible character designates that character for subsequent transmission. Sensible marks are shown to be placed in the 3 character designating position in zone 14*a*, the 7 character designating position in zone 14*b*, etc.

As will be more fully described later, according to a preferred embodiment of the invention are sensing mechanism by which the record card is sensed is an optical sensing mechanism which is insensitive to the color red, but sensitive to the color black. Accordingly, the digits in the zone 14 as well as zone lines $Z_2$ are recorded in the color red and are shown dotted in FIG. 1. The groups of code indicia in zones 12 and the zone lines $Z_1$, on the other hand are black and therefore sensible. It is to be understood, however, that the choice of color and recording medium is wholly arbitrary. For example, if magnetic sensors were employed the digits in zones 14 and the zone lines $Z_2$ would be recorded so as to be non-magnetic and the code indicia as well as the $Z_1$ lines would be magnetically recorded.

The zone lines $Z_1$ are sensibly recorded because they have a timing function in the operation of the sensing apparatus. The $Z_2$ lines serve merely to indicate an area within which the character designating marks should be confined and are non-sensibly recorded. The marks in the character designating positions are made sensible because they are operative to select the corresponding group of code indicia. The groups of code indicia are made sensible because signals derived therefrom are to be subsequently transmitted. The prerecorded characters are non-sensible because they function merely to indicate where a mark should be placed.

Turning now to a brief description of an apparatus for sensing the above described record card: After a plurality of control records have been suitably marked they are placed in a stacking device (not shown) and driven seriatim by a drive means 40 under a group of sensors 42. A single control record 10 is shown being passed from right to left under the sensor group in FIG. 3.

Each group of code indicia has a particular sensor 42–0 through 42–9 associated with it. As the control record 10 passes under the sensors the first $Z_1$ line is sensed by each of the sensors 42–0 through 42–9. Signals derived by the sensors are delivered on associated lines 44 to related amplifiers, 46–0 through 46–9 of an amplifier group 46.

Figures 3, 4:
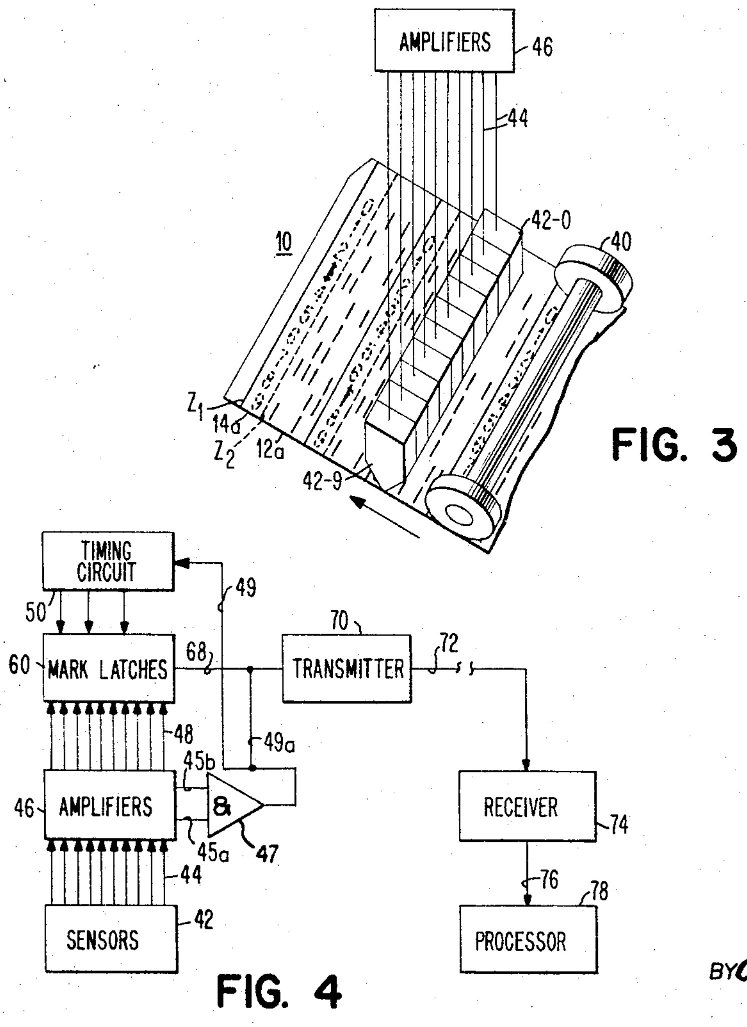
FIG. 3 is a schematic perspective view of the control record of FIG. 1 passing under a sensing mechanism.
FIG. 4 is a schematic block diagram of a system according to the invention for sensing and transmitting selected coded data, from the control records in FIGS. 1 and 2, to control a data processor.

Referring now to FIG. 4, signals from each of the amplifiers are delivered to an associated mark latch of a mark latch group 60. Signals from amplifiers 46–1 and 46–6 are also delivered on lines 45*a* and 45*b* to an AND circuit 47. Outputs from the AND circuit 47 are delivered on lines 49 and 49*a* to a timing circuit 50 and a transmitter 70 respectively. Upon receipt of the signal on line 49 the timing circuit initiates a chain of timing pulses which is delivered to each of the mark latches 60. See also FIG. 5, in which individual latch circuit 60–3 is shown in detail and the other latch circuits as separate blocks.

As zone 14*a* of the control record 10 passes under the sensors a signal is generated by sensor 42–3 in response to the mark in the "3" character designating position. After amplification the "3" signal is passed on to its associated mark latch causing that to be "set," in a manner to be described presently. A mark latch will not pass a signal until it is set. Since only the "3" mark latch has been set only that latch will pass subsequent signals.

The next indicia sensed by the sensors are the prerecorded code indicia in zone 12*a*. Although signals will be generated in response to each of the recorded bits in zone 12*a*, only those signals derived from the code indicia corresponding to the "3" character designating position will be passed by the respective mark latch. This is so because only the "3" mark latch has been previously set.

Signals from the mark latches 60 are delivered to a transmitter 70 which transmits them on line 72 to a remotely located receiver 74 from which they are sent to entry receiving devices, not shown, of a data processor 78.

Having described in detail a numeric control record and generally described a system for sensing said control record, a more detailed description of the system will now be provided. This will be accomplished by describing a cycle of operation for the combination of the numeric control record and the apparatus for sensing the control record.

Figure 6:
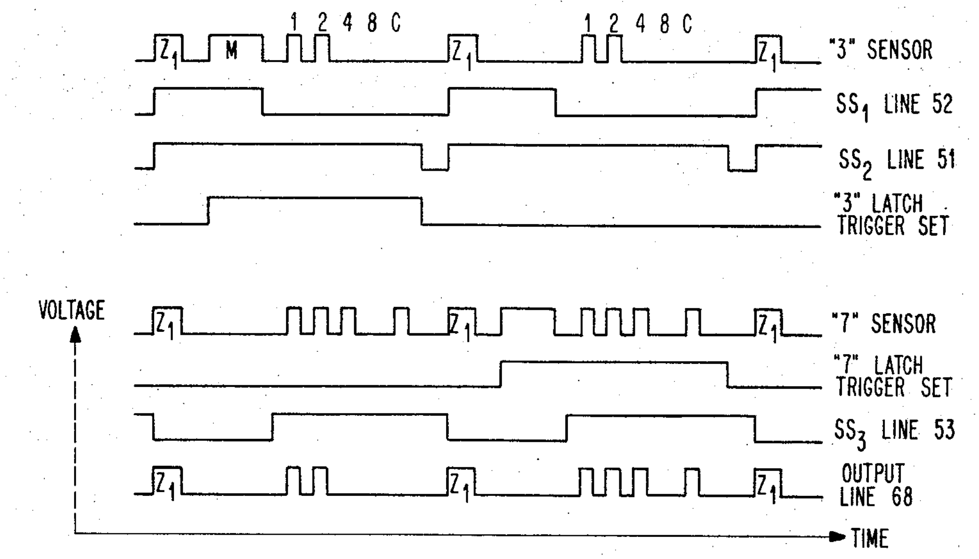
FIG. 6 is a pulse diagram of the operation of the system shown in FIG. 4 using the numeric control record of FIG. 1.

In order to better describe the operation and functions of various circuit components reference will be made to the pulse diagram of FIG. 6. In FIG. 6 the level of a horizontal line represents the voltage level, either positive or negative for example, of the component or line designated by the labels on the right. At any instant of time the voltage level of one component or line relative to any other may be determined by following a line perpendicular to the time axis. For example, in reference to the above described timing circuit it can be seen that at the time that $Z_1$ pulses are generated by each of the sensors a pair of single shot multivibrators labeled as $SS_1$ and $SS_2$ provide positive outputs; a third single shot multivibrator labeled $SS_3$ goes negative; and a $Z_1$ pulse appears on line 68.

Figure 5:
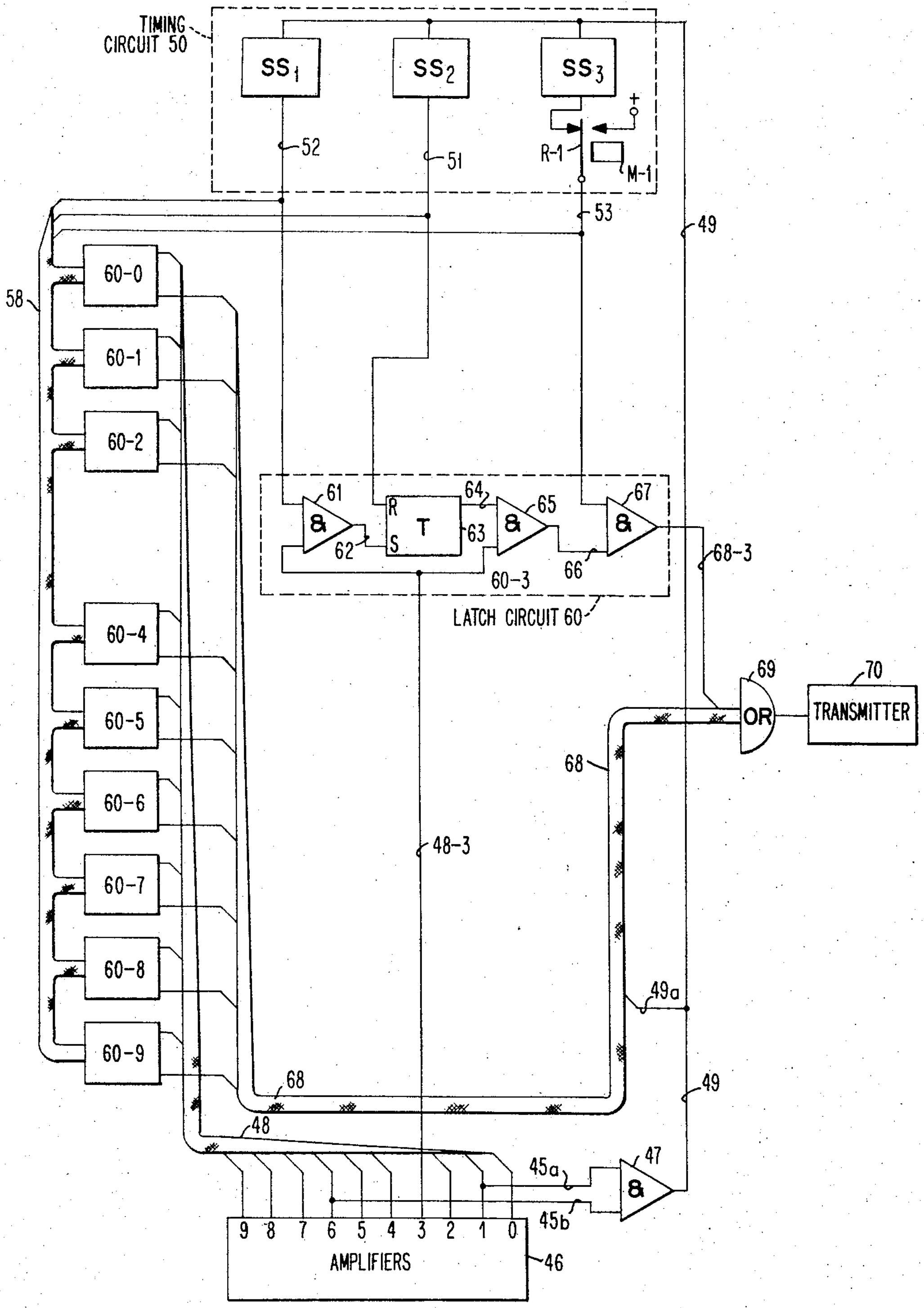
FIG. 5 is a schematic diagram showing in more detail the timing and latch circuits of FIG. 4.

As described above the first signals to be derived from a record card as it is passed under the sensors are those from the first $Z_1$ line. These signals, after being amplified, are passed on to their respective mark latches as shown in FIGS. 4 and 5.

It should be noted that none of the mark latches are "latched" at this time, therefore, none of these signals are passed to the transmitter. Signals from two of the amplifiers 46–1 and 46–6, for example are ANDed together at AND gate 47. An output signal from AND gate 47 is passed on line 49a directly to the transmitter to act as a synchronizing signal indicating that character code signals will follow in a timed relationship thereto. The signal from AND gate 47 is also delivered on line 49 to the timing circuit 50.

A signal on line 49 starts three single shot multivibrators $SS_1$, $SS_2$, $SS_3$ in the timing circuit 50. Each of the single shots produces a timed output pulse (see FIG. 6) which is delivered on line 52, 51, or 53, respectively (through cable 58) to each of the mark latches 60–0 through 60–9.

As the control record continues to be removed to the left in FIG. 3 the only sensor that produces a signal in response to zone 14a is the "3" sensor 42–3 because only the "3" character designating position contains a mark. In FIG. 6 the M on the line labeled "3" sensor illustrates that a mark has been sensed by the "3" sensor. This signal, after amplification is delivered on line 48–3 in FIG. 5, to an AND gate 61 of the associated mark latch 60–3 which is shown expanded in FIG. 5 and will now be described. At the time the signal derived from the "3" mark is received at AND gate 61 the output of $SS_1$ is positive and delivers a positive signal to each AND gate 61 in each mark latch. The coincident presence of the signal derived from the "3" mark and the positive signal from $SS_1$ sets the trigger 63 by means of an output pulse on line 62 from AND gate 61. Whenever the trigger 63 is "set" a positive pulse appears on line 64 to condition an AND gate 65 and the latch circuit 60 is said to be "latched." That is, subsequent signals on the associated line 48 will be gated through an AND circuit 65 onto line 66. It is important to note that as zone 14a passes under the sensors only the sensor 42–3 will generate a signal and hence, only the latch 60–3 will be latched so as to pass subsequent signals.

The next signals generated by the sensors are those derived in response to the 1-bits in zone 12a corresponding to the digits 1, 3, 5, 7, and 9. (Only those signals derived from the 3 and 7 digits are illustrated in FIG. 6.) Each of the 1-bit signals is delivered to AND gate 65 of the corresponding mark latch 60. Only the 1-bit signal derived from the "3" code group will be passed to AND gate 67, however, because only the "3" latch has been set.

Before the 1-bit code signal can be passed on to the transmitter it must be gated through the AND circuit 67 by a timing pulse from $SS_3$ on line 53 (through the normally closed contact of a relay R–1). As shown in FIG. 6 a positive pulse from $SS_3$ occurs only during the time that the sensors are sensing the prerecorded code indicia. In this manner, $SS_3$ functions to gate only the code pulses through AND gate 67.

The next signal on line 48–3 is derived from the 2-bit signal of the "3" code group in zone 14a and is sent to the transmitter in the same manner as the 1-bit signal.

Somewhat prior to the passage under the sensors of the $Z_1$ line preceding zone 14b, $SS_2$ times out and resets the trigger 63. As described above the reset signal from $SS_2$ is delivered to each trigger in each mark latch but inasmuch as only the "3" latch has been set, only the "3" latch is actually reset.

By referring to FIG. 6 it can be seen that each of the components or lines is in the same state just prior to the passage of the second $Z_1$ line under the sensors as it was at the start of the cycle of operation.

The next signals generated by the sensors are derived from the second $Z_1$ line. The timing chain is started in the same manner as described above, a $Z_1$ pulse is delivered to the transmitter, and again all of the AND gates 61 are conditioned by the output of $SS_1$. The next pulse generated by the sensors is that which is derived from the mark placed in the "7" character designating position of zone 14b, as shown by the M on the line labeled "7" sensor in FIG. 6. At this time, since only the "7" is marked, only the "7" latch is latched in response to a mark. Hence only the bit code pulses corresponding to the "7" character designation are subsequently passed by the respective AND gate 67 to the transmitter. FIG. 6 illustrates the sequence of pulses thus far delivered to the transmitter on line 68, i.e., a $Z_1$ pulse followed by a 1-bit pulse, followed by a 2-bit pulse; then another $Z_1$ pulse followed by 1, 2, and 4-bit pulses and finally, by a check-bit pulse.

$SS_2$ again times out and this time resets the trigger 63 associated with the "7" latch. Referring to FIG. 6 it can be seen that the system is again in the same state as it was at the start of the cycle of operation.

From the above description it can be seen that signals derived from the bit patterns corresponding to the 3 and 4 marks in the next two character zones will be sensed and passed to the transmitter in the same manner, each bit pattern being preceded by a $Z_1$ pulse.

Pulses that have been passed through the various latches are ORed together at OR circuit 69 for delivery to the transmitter 70. As shown in FIG. 4, line 72 delivers the signals from the transmitter to a remote receiver 74. Signals from the receiver are then delivered via line 76 to a data processing machine 78 where they are used to control entry receiving devices thereof, not shown.

From the above general description of an embodiment of the invention it can be seen that a control system is provided wherein a control record can be marked "in the field" and the data thereon transmitted to a remote receiver without requiring that separate coding apparatus be employed prior to transmission. Hence, a primary objective of the invention has been accomplished.

Figure 2:
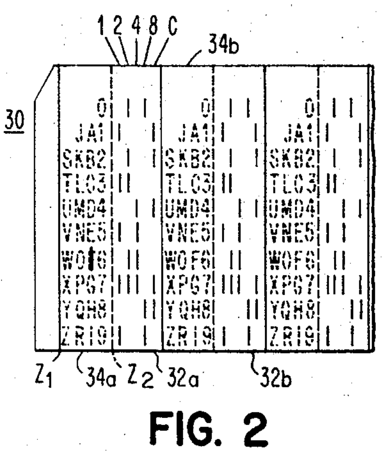
FIG. 2 is a similar view of an embodiment of a control record of the alphanumeric type, in accordance with the invention.

A second embodiment of a control record according to the invention lies in the alphanumeric record card of FIG. 2. Although similar to the numeric control record it has the added advantage of being able to "pack" all 26 standard alphabetic characters and ten numeric digits into a relatively small space.

The ability to "pack" the alphanumeric record card stems from the fact that although each character group has associated therewith a prerecorded group of sensible code indicia, a signal derived from a character designation mark itself forms part of the group of code pulses which are subsequently transmitted. In this manner a separate code for each character or digit is not required to be prerecorded on the control record.

Referring now to FIG. 2; a control record 30 has fields 34 which have been recorded therein both alphabetic and numeric characters (hence alphanumeric). Associated with each digit are as many as three alphabetic characters to form a character group of four characters which may be referred to as a data-unit, e.g., in zone 34a of control record 30 the Z, R, I, and 9 are referred to as a 9-data-unit (in zone 14a of control record 10 the "9" is also referred to as a 9-data-unit). It should be noted that it does not matter which numeric digits and alphabetic characters comprise a particular data-unit, so long as the characters comprising a particular data-unit are predetermined. Similar to the numeric record each data-unit in zone 34 has associated therewith in a related zone 32 a group of prerecorded sensible code indicia.

Substantially the same system as that used with the numeric control record is used to selectively transmit the signals derived from the alphanumeric control record. Any changes thereto will be noted in the following description of a cycle of operation for the alphanumeric record card.

As a record card 30, marked as shown in FIG. 2, is moved from right to left under the sensors 42 in FIG. 3, the first signals generated by the sensors are derived from the first $Z_1$ line. Again signals from 46–1 and 46–6 sensors are ANDed together at AND gate 47 which produces a pulse on line 49 to the timing circuit and delivers a $Z_1$ pulse on line 49a to the transmitter.

The timing chain is started in the same manner as described above with the exception that $SS_3$ does not operate. When an alphanumeric control record is sensed it is desired to transmit a signal derived from the character designating mark in zone 34a. Accordingly a magnet M–1 is activated by any convenient means, changing the contact position of a relay R–1 and putting a positive signal on line 53, thereby partially conditioning the AND gate 67 in each of the latches 60 to pass subsequent pulses derived from the marks placed in zones 34.

Figure 7:
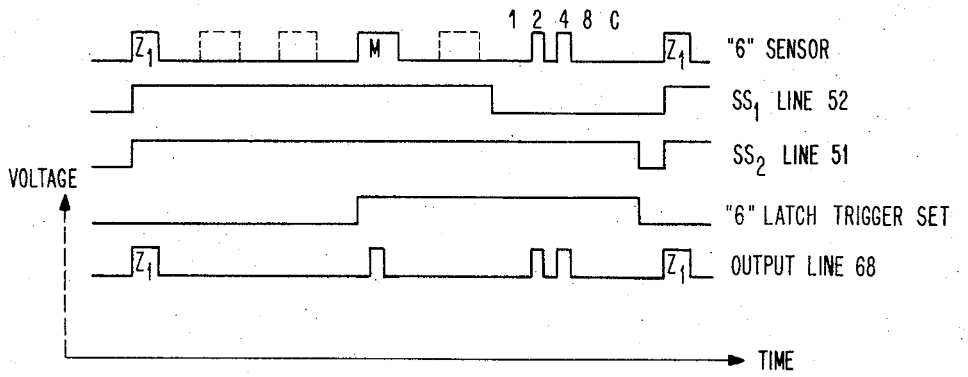
FIG. 7 is a pulse diagram of the operation of the system shown in FIG. 4 using the alphanumeric control record of FIG. 2.

As shown in FIG. 7, a pulse diagram for the alphanumeric card, $SS_1$ and $SS_2$ produce positive signals in response to a $Z_1$ pulse. Each of the AND gates 61 in each of the latch circuits 60 is conditioned by the positive output of $SS_1$ to pass the next signal from the sensors. The only sensible mark in zone 34a, however, is that covering the F character designating position of the 6-data-unit. Thus, no signals will be generated by the sensors until the mark in the F position is sensed by the 42–6 sensor. At that time the signal derived from the F mark is gated through AND gate 61 to set trigger 63 which in turn allows the F signal to be gated through AND gate 63 and onto line 66. This signal on line 66 is then gated through AND gate 67 for delivery on line 68 to the transmitter 70.

Leaving the description of a cycle of operation for a moment; it is important to note at this time that whereas the signals generated in response to character designation marks on the numeric control record are not transmitted, those signals generated in response to the character designation marks on the alphanumeric card are transmitted. The effect of this is to add four additional bit positions to each character code group. Five bit positions are selectively prerecorded or not with sensible code indicia in zone 32a just as the code indicia were prerecorded in zone 12a of the numeric card. The additional four bit positions are the character designation locations in zone 34a. By selecting which of the character designating positions is to be marked, therefore, the person marking the card completes the character code.

Returning now to the cycle of operation for the alphanumeric control record where the "6" mark latch has just been latched; the only signals from the sensors that will subsequently be delivered to the transmitter are the code pulses from sensor 42–6. Thus, the 2 and 4 bit pulses from sensor 42–6, corresponding to the bit pattern for the 6-data-unit, are gated through AND gate 65 by the output of trigger 63, and on through AND gate 67 for delivery to the transmitter via line 68. The output line in FIG. 7 illustrates the output pulses arising from the above described cycle of operation.

Shortly before the next $Z_1$ line passes under the sensors $SS_2$ times out resetting the trigger 63, thereby "unlatching" the "6" latch. At this time, as shown in FIG. 7, the system has returned to its original state in preparation for reading subsequent zones 34 in the manner as that just described.

An alphanumerical control means is thus provided which is capable of being marked "in the field" and adapted to have the information recorded thereon transmitted directly to a distant processor without requiring a separate coding operation before transmission.

Moreover, a system has been provided which senses the control records and transmits electrical signals representing the groups of coded data which are designated by the placement of control marks in the related character designating positions on the record.

The invention has been shown as being embodied in a system which inhibits the transmission of all sensed pulses except those that are selected for transmission. It is evident that a control, similar to that described above, can be exerted on the sensors themselves to inhibit the sensing of all pulses except those that are selected for transmission.

While the invention has been particularly shown and described with reference to preferred embodiments thereof, it will be understood by those skilled in the art that the foregoing and other changes in form and details may be made therein without departing from the spirit and scope of the invention.

We claim:

1. An apparatus for sensing and transmitting to entry receiving devices sensible indicia on a sheet having a plurality of first groups of sensible indicia thereon, which indicia are coded representations of different characters, a plurality of second groups of normally non-sensible indicia, each of said second groups being aligned with a different one of said first groups and each containing a character designating indicium, and timing indicium located adjacent each said second group, said sensing and transmitting character comprising:
   - sensor means to generate electrical signals in response to sensible indicia on said sheet;
   - selection means for selecting among the signals generated by said sensor means only those signals obtained from first groups of sensible indicia whose aligned second groups contain sensible character designating indicia;
   - means for transmitting said selected electrical signals to entry receiving devices;
   - said selection means including:
     - a timing circuit operative in response to electrical signals generated by said sensors in response to said timing indicia for providing a chain of timing signals;
     - means to deliver electrical signals from said sensors to said timing circuit;
     - gating means between said sensors and said transmitting means operative in response to the coincidence of a timing signal from said timing circuit and a signal from said sensing means generated in response to a sensible character designating indicium, for delivering to said transmitting means electrical signals generated in response to sensible indicia in those first groups whose aligned second groups contain sensible character designating indicia.

2. A control system for controlling the operation of entry receiving devices of a data processing machine including a control means sheet having in a first field thereon a plurality of groups of sensible code indicia, the indicia of each of said groups being arranged in a unique code combination to represent a particular data unit of a set of data units, a sensible timing indicium on said sheet having a prescribed spacial relationship to said first field, each of said groups having aligned therewith on said sheet, a related character designating position for each character of the associated data unit, and a sensible control designation in one of said character designating positions for selecting the related group of sensible code indicia, said system comprising:
   - a plurality of sensors, there being one sensor associated with each of said groups of sensible code indicia for generating electrical signals in response to said sensible code indicia;
   - a timing circuit;
   - means to deliver electrical signals from said sensors to said timing circuit, said timing circuit being operative in response to an electrical signal from said sensors generated in response to said timing indicium to generate a chain of timing signals;
   - a transmitter;
   - a gating means between said sensors and said transmitter;
   - means to deliver timing signals from said timing circuit to said gating means;
   - means to deliver electrical signals from said sensors to said gating means;

said gating means being operative in response to:

a coincidence of a timing signal from said timing circuit, and a signal from said sensing means generated in response to said control designation, for gating the signals generated in response to the code indicia corresponding to said control designation, from the related sensor to said transmitter.

3. A control system for controlling the operation of entry receiving devices of a data processing machine including a control sheet having located in a first field thereon a plurality of groups of sensible code indicia, the indicia of each of said groups being arranged in a unique code combination to represent a particular character group, each character group being comprised of a plurality of characters, a sensible timing indicium on said sheet having a prescribed spacial relationship to said first field, each of said code groups having associated therewith on said sheet in a prescribed spacial relationship thereto, related character designating positions, one corresponding to each character of the associated character group, and a sensible control designation in one of said character designating positions for selecting the related code group of sensible code indicia, said system comprising:

a plurality of sensors, there being one sensor associated with each of said groups of sensible code indicia groups for generating electrical signals in response to said sensible code indicia;

a timing circuit;

means to deliver electrical signals from said sensors to said timing circuit, said timing circuit being operative in response to an electrical signal from said sensors generated in response to said timing indicium to generate a chain of timing signals;

a transmitter;

a gating means between said sensors and said transmitter;

means to deliver timing signals from said timing circuit to said gating means;

means to deliver electrical signals from said sensors to said gating means;

said gating means being operative in response to:

a coincidence of a timing signal from said timing circuit, and a signal from said sensing means generated in response to said control designation, for gating the signals generated in response to said control designation and the code indicia corresponding to said control designation, from the related sensor to said transmitter.

References Cited

UNITED STATES PATENTS

| | | | |
|---|---|---|---|
| 2,308,927 | 1/1943 | Maul | 235—61.12 X |
| 2,600,817 | 6/1952 | Victoreen | 235—61.12 |
| 2,288,770 | 7/1942 | Armbruster | 235—61.12 |

DARYL W. COOK, *Primary Examiner.*